US009188384B2

(12) United States Patent
Fricke et al.

(10) Patent No.: US 9,188,384 B2
(45) Date of Patent: Nov. 17, 2015

(54) DYNAMICALLY EVACUABLE DEVICES COMPRISING ORGANIC AEROGELS OR XEROGELS

(75) Inventors: Marc Fricke, Osnabrueck (DE); Markus Schütte, Osnabrueck (DE); Frank Fechner, Melle (DE); Jörg Krogmann, Lohne (DE)

(73) Assignee: BASF SE, Ludwigshafen (DE)

( * ) Notice: Subject to any disclaimer, the term of this patent is extended or adjusted under 35 U.S.C. 154(b) by 776 days.

(21) Appl. No.: 13/432,820

(22) Filed: Mar. 28, 2012

(65) Prior Publication Data

US 2012/0248125 A1 Oct. 4, 2012

Related U.S. Application Data

(60) Provisional application No. 61/469,834, filed on Mar. 31, 2011.

(51) Int. Cl.
*B32B 1/02* (2006.01)
*F25D 23/06* (2006.01)
*B01J 13/00* (2006.01)

(52) U.S. Cl.
CPC .............. *F25D 23/06* (2013.01); *B01J 13/0091* (2013.01); *F25D 2201/14* (2013.01)

(58) Field of Classification Search
CPC ........ B32B 1/02; B32B 1/08; Y10T 428/1376
USPC ............ 428/34.1, 34.2, 35.7, 35.9, 36.9, 36.5
See application file for complete search history.

(56) References Cited

U.S. PATENT DOCUMENTS

| | | | |
|---|---|---|---|
| 1,898,977 A | 2/1933 | Comstock | |
| 5,934,085 A | 8/1999 | Suzuki et al. | |
| 5,945,084 A * | 8/1999 | Droege ...................... | 423/447.4 |
| 6,209,343 B1 | 4/2001 | Owen | |
| 2004/0186191 A1 | 9/2004 | Fox et al. | |
| 2009/0031659 A1* | 2/2009 | Kalfon ........................ | 52/404.1 |
| 2010/0148109 A1* | 6/2010 | Schadler et al. ............... | 252/62 |
| 2011/0218259 A1 | 9/2011 | Eling et al. | |
| 2011/0218262 A1 | 9/2011 | Eling et al. | |
| 2011/0218324 A1 | 9/2011 | Zarbakhsh et al. | |
| 2011/0263737 A1 | 10/2011 | Fricke et al. | |
| 2011/0263742 A1 | 10/2011 | Zarbakhsh et al. | |
| 2011/0319508 A1 | 12/2011 | Fricke et al. | |
| 2012/0067499 A1 | 3/2012 | Elbing et al. | |
| 2012/0142800 A1 | 6/2012 | Fricke et al. | |
| 2012/0193286 A1 | 8/2012 | Prissok et al. | |
| 2012/0225280 A1 | 9/2012 | Schütte et al. | |
| 2012/0232180 A1 | 9/2012 | Kunst et al. | |

FOREIGN PATENT DOCUMENTS

| | | |
|---|---|---|
| EP | 0 057 548 A2 | 8/1982 |
| EP | 0 587 546 A1 | 3/1994 |
| EP | 0 860 669 A1 | 8/1998 |
| EP | 1 335 171 A1 | 8/2003 |
| FR | 2 628 179 | 9/1989 |
| TW | 443980 B | 7/2001 |
| WO | WO 00/18225 | 4/2000 |
| WO | WO 00/24799 | 5/2000 |
| WO | WO 2004/010042 A1 | 1/2004 |
| WO | WO 2005/093349 A1 | 10/2005 |
| WO | WO 2008/138978 A1 | 11/2008 |
| WO | WO 2009/027310 | 3/2009 |
| WO | WO 2010/127947 A2 | 11/2010 |
| WO | WO 2010/130652 A2 | 11/2010 |
| WO | WO 2011/000771 A2 | 1/2011 |
| WO | WO 2011/018371 A1 | 2/2011 |
| WO | WO 2011/039082 A1 | 4/2011 |
| WO | WO 2011/045306 A1 | 4/2011 |
| WO | WO 2011/069959 A2 | 6/2011 |
| WO | WO 2011/107366 A1 | 9/2011 |
| WO | WO 2011/107367 A1 | 9/2011 |
| WO | WO 2011/107374 A1 | 9/2011 |
| WO | WO 2011/134856 A1 | 11/2011 |
| WO | WO 2011/134866 A2 | 11/2011 |
| WO | WO 2012/000917 A1 | 1/2012 |
| WO | WO 2012/038215 A1 | 3/2012 |
| WO | WO 2012/059388 A1 | 5/2012 |
| WO | WO 2012/113759 A1 | 8/2012 |
| WO | WO 2012/119892 A1 | 9/2012 |
| WO | WO 2012/119970 A2 | 9/2012 |
| WO | WO 2012/126742 A1 | 9/2012 |

OTHER PUBLICATIONS

U.S. Appl. No. 14/033,708, filed Sep. 23, 2013, Fricke, et al.
U.S. Appl. No. 14/104,135, filed Dec. 12, 2013, Cristadoro, et al.
U.S. Appl. No. 13/381,231, filed Dec. 28, 2011, Marc Fricke, et al.
U.S. Appl. No. 13/389,969, filed Feb. 10, 2012, Marc Fricke, et al.
U.S. Appl. No. 13/422,704, filed Mar. 16, 2012, Marc Fricke, et al.
U.S. Appl. No. 13/289,441, filed Nov. 4, 2011, Marc Fricke, et al.
U.S. Appl. No. 13/403,530, filed Feb. 23, 2012, Marc Fricke, et al.
European Search Report issued Oct. 20, 2011, in European Patent Application No. 11160648.9 (with English Translation of Categories of Cited Documents).
Office Action issued Jan. 4, 2015 in Chinese Patent Application No. 2012800159568 (submitting English translation only).
U.S. Appl. No. 13/515,139, filed Jun. 11, 2012, Fricke, et al.
International Search Report and Written Opinion issued Oct. 15, 2012, in International Application No. PCT/EP2012/055272 (with English translation of Category of Cited Documents).

* cited by examiner

*Primary Examiner* — Marc Patterson
(74) *Attorney, Agent, or Firm* — Oblon, McClelland, Maier & Neustadt, L.L.P.

(57) ABSTRACT

The present invention relates to a dynamically evacuable, electrically operated device comprising a coherently evacuable region and a temperature-controllable useful region, which is thermally insulated from the ambient temperature by the coherently evacuable region, and also a means for actively maintaining a vacuum, such that the pressure in the coherently evacuable region of the device is constantly within a defined pressure range, said coherently evacuable region making up at least 20% by volume of the total volume which is occupied by a porous and/or cellular insulating material in the device, and said coherently evacuable region comprising at least one organic aerogel and/or organic xerogel.

9 Claims, No Drawings

DYNAMICALLY EVACUABLE DEVICES COMPRISING ORGANIC AEROGELS OR XEROGELS

The present invention relates to an electrically operated and dynamically evacuable device comprising a coherently evacuable region and a temperature-controllable useful region, which is thermally insulated from the ambient temperature by the coherently evacuable region, and also a means for actively maintaining a vacuum, such that the pressure in the coherently evacuable region of the device is constantly within a defined pressure range, said coherently evacuable region making up at least 20% by volume of the total volume which is occupied by a porous and/or cellular insulating material in the device, and said coherently evacuable region comprising at least one organic aerogel and/or organic xerogel.

The invention further relates to the use of organic aerogels or organic xerogels within a coherently evacuable region in electrically operated and dynamically evacuable devices which have, in addition to the coherently evacuable region, a temperature-controllable useful region which is thermally insulated from the ambient temperature by the coherently evacuable region, and also a means for actively maintaining a vacuum, such that the pressure in the coherently evacuable region of the device is constantly within a defined pressure range, said coherently evacuable region making up at least 30% by volume of the total volume which is occupied by a porous and/or cellular insulating material in the device.

Thermal insulation to save energy is of great significance. Thermal insulation is becoming ever more important against a background of rising energy costs and the drive for a reduction in $CO_2$ output, and also the future rise in demands on heat and cold insulation. These rising demands on optimization of thermal insulation comprise both buildings and cold insulation in the mobile, logistics and stationary sectors.

Thermal insulation devices include a defined useful region which is delimited from the environment by appropriate insulation, the temperature of the useful region being either above or below the outside temperature. These include, for example, refrigerators, freezers, refrigerated warehouses, refrigerated containers, coolboxes, refrigerated trucks, or else hot water tanks.

In the prior art, useful space is thermally insulated from the environment by thermal insulation materials.

For the purposes of thermal insulation, a multitude of insulation materials are known, and closed-cell foams play a major role due to their particularly low thermal conductivity. Closed-cell rigid polyurethane (PUR) foams are among the materials with the lowest thermal conductivities. The rigid PUR foams are usually foamed with physical blowing agents such as alkanes or fluorinated hydrocarbons, which themselves have a lower thermal conductivity than air and remain in the cells of the foam. The prevailing pressure in the foam corresponds to the outside pressure.

In recent times, evacuated open-cell foams made from PUR, or open mesoporous powder beds such as Aerosils, have also been used in the form of vacuum insulation panels (VIPs). The VIPs are used in panel form in further additional steps together with conventional insulating materials in the later insulating units. For example, VIPs are nowadays integrated into refrigerators by adhesive bonding and in-mold foaming with PUR, and hence contribute to lowering of the energy consumption. The greatest disadvantage of VIPs is the additional complexity of manufacturing the VIPs, and the incorporation thereof into the system. Since the VIPs always make up only part of the overall insulation, low reduced pressures have to be achieved to obtain correspondingly low thermal conductivities. In order to keep this reduced pressure as stable as possible for the lifetime of the system, very high demands are made on the density of the shell material. Typically, either metalized aluminum multilayer foils or else aluminum composite foils are nowadays used here.

A further technical alternative is that of the evacuation or else partial evacuation of the entire volume provided for thermal insulation, and the evacuation can in principle be effected dynamically or else statically. The great advantage over the combination of VIPs and the encasing thereof with conventional insulating materials is that the entire volume that makes up the insulating material is exposed to a reduced pressure and hence the reduced pressure needed may be comparatively smaller than in a conventional VIP, or a higher insulating effect can be achieved with the same reduced pressure. Such evacuable devices are already known per se to those skilled in the art.

U.S. Pat. No. 1,898,977 describes a refrigerator with evacuable insulation. The insulating material proposed is a fine filler and cavities with very small dimensions produced thereby, ideally much smaller than the mean free path length of gas molecules. To avoid loss by thermal conduction at corners, the metal layers between outer and inner walls should be bonded via bridges of materials with low thermal conductivity. Silocel, cork and paper are mentioned as insulating material.

EP 0 587 546 A1 describes an evacuable refrigerator provided with a permanently installed vacuum pump. The vacuum pump evacuates the insulation material disposed within a housing which can be sealed airtight. Due to the long evacuation times, it is envisaged that the pump is only activated once the cabinet has been installed at the user's premises. Evacuation of the units during production would prolong the cycle times for the production of a unit, and so the production process becomes uneconomic. The pump is a specific pump which has a very low energy consumption, and hence the energy saving as a result of the improvement of the insulation properties is much greater than the energy required for the operation of the vacuum pump. Conventional vacuum pumps are unsuitable due to the excessively high intrinsic consumption of energy.

The insulation material proposed is a purely water-blown closed-cell PUR foam. In this case, the cells of the foam at first comprise carbon dioxide, which has a diffusion rate higher by a factor of five compared to air. The aim is a reduced pressure of less than 0.1 mbar.

The great technical disadvantage of this approach is that extremely long evacuation times are needed. This is caused by the closed-cell nature of the foam. In addition, very low pressures have to be achieved to sufficiently lower the thermal conductivity. This is connected to the high cell diameter of conventional rigid foams.

EP 0 587 548 A1 describes similar subject matter, the emphasis here being placed on the closed-cell nature of the insulation material. Open-cell foams are described as disadvantageous since it is not possible here to achieve sufficient mechanical strength with low densities.

EP 1 335 171 A1 describes an evacuable refrigerator in which the evacuation times are shorted by equipping the thermal insulation material with a network of channels. For example, the rear side wall is evacuated via a spider's web-like arrangement of suction channels. The thermal insulation materials mentioned are open-cell polyurethane and polystyrene. In addition, reference is made to the problem of excessively long evacuation times with the existing materials.

WO 2005/093349 describes an evacuated refrigerator filled with powder as a thermal insulation material. It is pointed out that the vacuum can, in principle, be applied statically and dynamically. The refrigerator does not need a vacuum pump since this function is assumed by the compressor.

WO 2004/010042 describes an evacuable refrigerator which comprises a powder bed. One means of filling exists via an opening in the rear side of the housing. Different variants for later sealing are mentioned.

WO 2010/127947 describes fully evacuated door elements. The filler material mentioned is open-pored PUR, polystyrene or silica powder.

However, the devices proposed in the prior art have fundamental disadvantages which have prevented industrial implementation to date. The cause lies in the insulating materials used. Insulating materials used to date, to the extent that they are open-cell at all, do not have a suitable pore structure which permits sufficiently short evacuation times. This is because even completely open-cell foams may require long evacuation times when the size of the holes in the cell window is small and the foam differs to a great extent from the ideal form of a simple thermoset plastic foam. In addition, known insulating materials with favorable thermal insulation properties are available only in the form of slabs, or as powder (in some cases also in pressed form). Subsequent matching of the shaped bodies to the geometry needed for the unit can be achieved, if it is possible at all, only at great cost and inconvenience, and significant amounts of waste occur. In the case of powder beds, it is usually impossible to completely fill complicated geometries, for example undercuts, or to achieve sufficiently defined compaction.

Known open-cell insulating materials additionally have the disadvantage that they form a skin in the course of production. This impairs evacuability, especially in the case of relatively large coherently evacuable regions, since the skin prevents the gas which fills the cells from being pumped out.

The industrial implementation of the aforementioned cooling devices has therefore failed to date because of the absence of a suitable insulation material.

An improved evacuable thermal insulation device, for example, an evacuable refrigerator, should have a short evacuation time and associated shorter pumping times and shorter pump cycles, and lower demands on the density of the shell of the region to be evacuated coherently.

The insulation material present in the coherently evacuable region should at the same time have the following properties:
- low material consumption in the production of the thermal insulation in the device
- high lowering of the thermal conductivity at pressures in the range from 1 to 10 mbar
- possibility of establishing a complex three-dimensional geometry without aftertreatment steps
- low uptake capacity for water vapor and low absorption capacity for gases in general, which is particularly important for the dynamic maintenance of a vacuum.

It was an object of the present invention to discover an evacuable thermal insulation device which avoids the abovementioned disadvantages or has them to a lesser degree. More particularly, the period within which a desired pressure difference is established within the entire volume to be evacuated (evacuation time for a given lowering of the pressure) should be reduced compared to the prior art. The insulation material used should have the aforementioned properties.

Accordingly, the inventive device and the inventive use have been found.

Preferred embodiments can be inferred from the claims and the description. Combinations of preferred embodiments do not leave the scope of this invention.

The inventive device comprises a coherently evacuable region and a temperature-controllable useful region, which is thermally insulated from the ambient temperature by the coherently evacuable region, and also a means for actively maintaining a vacuum, such that the pressure in the coherently evacuable region of the device is constantly within a defined pressure range, said coherently evacuable region making up at least 20% by volume of the total volume which is occupied by a porous and/or cellular insulating material in the device, and said coherently evacuable region comprising at least one organic aerogel and/or organic xerogel.

The term "a coherently evacuable region" should in principle be understood as "at least one coherently evacuable region". Thus, the inventive device may also comprise several of the coherently evacuable regions thus defined, in which case each individual region containing the aerogel and/or xerogel is coherently evacuable alone (separately). Of course, several such regions may be addressed by a single evacuating device. What is essential to the invention is in any case that one of the regions mentioned makes up at least 30% by volume of the total volume which is occupied by a porous and/or cellular insulating material in the device. It is optionally also possible for two or more coherently evacuable regions containing aerogel and/or xerogel each to fulfill this criterion alone.

Organic aerogels and organic xerogels are known per se. In the literature, a xerogel is understood to mean a porous material which has been produced by a sol-gel process, the liquid phase having been removed from the gel by drying below the critical temperature and below the critical pressure of the liquid phase ("subcritical conditions"). In contrast, reference is made to aerogels when the removal of the liquid phase from the gel has been performed under supercritical conditions.

In the sol-gel process, a sol based on a reactive organic gel precursor is first prepared and then the sol is gelated to give a gel by a crosslinking reaction. In order to obtain a porous material, for example a xerogel, from the gel, the liquid has to be removed. This step is referred to hereinafter simply as drying.

WO-2008/138978 discloses xerogels comprising from 30 to 90% by weight of at least one polyfunctional isocyanate and from 10 to 70% by weight of at least one polyfunctional aromatic amine, the volume-weighted mean pore diameter of which is at most 5 micrometers.

A coherently evacuable region is a spatially delimited region within the inventive device which can be evacuated coherently, i.e. experiences a reduced pressure as a result of application of a vacuum at one point in the entire region.

The term "coherently evacuable" means that the pressure in the region in question after evacuation has been permanently reduced with respect to ambient pressure, i.e. the region in question is sealed from the environment with respect to gas diffusion (diffusion of the air constituents). The person skilled in the art is aware that a pressure difference can always be maintained only for a limited time. After the evacuation (i.e. after the establishment of a reduced pressure), a reduced pressure has to be maintained at least over a period of 1 hour in order to meet the criteria of "evacuable" and "sealed", especially at least 4 hours, more preferably at least 24 hours.

The temperature-controllable useful region is the region within the device in which the lowered or increased temperature relative to the ambient temperature is to be maintained.

The entire volume which is occupied by a porous and/or cellular insulating material within the device corresponds to the volume of all porous and/or cellular insulating materials in the device and includes the pores or cells. Porous and/or cellular insulating materials are substances which have cells or pores which are completely or partly surrounded by the insulating material, i.e. the materials include a first solid phase and a second phase filled with a gas (optionally under reduced pressure or vacuum). The pores or cells reduce the thermal conductivity of the insulating material. Porous and/or cellular materials may have open or closed cells. Mixed forms are likewise conceivable. This definition includes all materials which have pores and/or cells and are introduced into the device for the purposes of thermal insulation, not only the organic aerogels and/or xerogels present in accordance with the invention but especially foams, for example polyurethane foams or foams based on polystyrene.

The volume of the coherently evacuable region containing organic aerogels or xerogels encompassed in accordance with the invention is preferably at least 30% by volume, especially at least 40% by volume, more preferably at least 50% by volume, especially at least 60% by volume, most preferably at least 70% by volume, based on the total volume which is occupied by a porous and/or cellular insulating material in the device.

Vacuum is understood to mean a reduced pressure relative to ambient pressure. Evacuation is thus the generation of a reduced pressure relative to ambient pressure.

In the context of the present invention, a xerogel is understood to mean a porous material having a porosity of at least 70% by volume and a volume-average mean pore diameter of at most 50 micrometers, which has been produced by a sol-gel process, the liquid phase having been removed from the gel by drying below the critical temperature and below the critical pressure of the liquid phase ("subcritical conditions").

Correspondingly, an aerogel in the context of the present invention is understood to mean a porous material having a porosity of at least 70% by volume and a volume-average mean pore diameter of at most 50 micrometers, which has been produced by a sol-gel process, the liquid phase having been removed from the gel by drying above the critical temperature and above the critical pressure of the liquid phase ("supercritical conditions").

The mean pore diameter is determined by means of mercury intrusion measurement according to DIN 66133 and, in the context of the present invention, is always a volume-weighted mean value. Mercury intrusion measurement according to DIN 66133 is a porosimetry method and is conducted in a porosimeter. This involves injecting mercury into a sample of the porous material. Small pores require a higher pressure to be filled with the mercury than large pores, and the corresponding pressure/volume diagram can be used to determine a pore size distribution and the volume-weighted mean pore diameter.

The volume-weighted mean pore diameter of the porous material is preferably at most 20 micrometers. The volume-weighted mean pore diameter of the porous material is more preferably at most 10 micrometers, even more preferably at most 5 micrometers and especially at most 3 micrometers.

A minimum pore size coupled with high porosity is desirable from the point of view of low thermal conductivity. As a result of production, however, there is a practical lower limit in the volume-weighted mean pore diameter. In general, the volume-weighted mean pore diameter is at least 50 nm, preferably at least 100 nm. In many cases, the volume-weighted mean pore diameter is at least 200 nm, especially at least 300 nm.

The inventive device is electrically operated. The temperature of the useful region of the inventive device is preferably controlled by active energy input. The means for actively maintaining the vacuum is preferably a compressor and/or pump, which is especially electrically operated.

In a first preferred embodiment of the present invention, the inventive device is a refrigerating unit, more preferably a refrigerator, a freezer, a refrigerated warehouse, an electrically operated refrigerated vessel or a refrigerated truck. A refrigerating unit is a device with which a defined useful space is cooled by energy input, such that the useful space is cooler (has a lower temperature) than the ambient temperature.

In a further preferred embodiment of the present invention, the inventive device is a device for heating materials, especially a hot water tank.

A dynamically evacuable device is an evacuable device as defined above, in which the vacuum is actively maintained in such a way that it is constantly within a defined pressure range. "Actively" in this context means: by repeated action of the means for maintaining the vacuum. The vacuum is maintained here by the sealed nature of the region on the one hand, and by recurrent pressure lowering. The recurrent pressure lowering can be effected either permanently or in a periodically recurrent manner, preference being given to the latter. In contrast, a fully evacuable device is a device as defined above, in which the vacuum results from single application and is maintained solely by the sealed nature of the region.

Such devices are known per se to those skilled in the art. The organic aerogels or organic xerogels used in accordance with the invention can advantageously be used in all devices which have, in addition to the coherently evacuable region, a temperature-controllable useful region which is thermally insulated from the ambient temperature by the coherently evacuable region, the coherently evacuable region making up at least 20% by volume of the total volume which is occupied by an insulating material in the device. There are no particular restrictions with regard to the technical designs of the thermal insulation device itself.

Particularly preferred devices are dynamically evacuable refrigerating units, especially refrigerators.

A suitable dynamically evacuable electrically operated refrigerator or freezer has one or more sealed thermally insulating regions, which are a housing, wall and/or door filling in the refrigerator or freezer, the space or spaces being connected via an evacuation line to a vacuum-generating device and the vacuum-generating device being a permanently installed unit in the refrigerator or freezer. Such a refrigerator or freezer is known, for example, from U.S. Pat. No. 1,898, 977 and from FR-A-26 28 179 and from EP-A 0587546.

The exact technical design with which the static or dynamic vacuum is established is not relevant to the present invention. Instead, the porous materials used in accordance with the invention can advantageously be used as insulating material when large volumes comprising an insulating material are evacuated coherently. For example, the cabinet, as described in EP-A 0587546, can be equipped with a vacuum pump in the course of manufacture, which is connected to spaces sealed airtight in the walls and the door of the cabinet, the spaces being filled with the inventive heat-insulating material. When the cabinet is switched on by the user, the pump is activated and then generates a very low pressure step by step over a long period of use, which means that the efficiency of the insulation is enhanced stepwise from one week up to several months. Alternatively, a compressor used in the device can be used to maintain a reduced pressure in the evacuable region, as described, for example, in WO 2005/093349.

Organic xerogels and aerogels preferred in the context of the present invention are described hereinafter.

The organic aerogel or xerogel is preferably based on isocyanates and optionally further components reactive toward isocyanates.

The organic aerogel or xerogel is more preferably based on isocyanates and components reactive toward isocyanates, the component reactive toward isocyanates used being at least one polyfunctional aromatic amine. The organic aerogel and/or xerogel is preferably based on polyurea and/or polyisocyanurate.

"Based on polyurea" means that at least 50 mol %, preferably at least 70 mol %, especially at least 90 mol % of the linkages of the monomer units in the organic xerogel or aerogel are present as urea linkages. "Based on polyisocyanurate" means that at least 50 mol %, preferably at least 70 mol %, especially at least 90 mol % of the linkages of the monomer units in the organic xerogel or aerogel are present as isocyanurate linkages. "Based on polyurea and/or polyisocyanurate" means that at least 50 mol %, preferably at least 70 mol %, especially at least 90 mol % of the linkages of the monomer units in the organic xerogel or aerogel are present as urea linkages and/or isocyanurate linkages.

The organic aerogel or xerogel used in accordance with the invention is referred to hereinafter as organic porous material.

Preferably, the organic porous material used is obtained in a process which comprises the following steps:
(a) reaction of at least one polyfunctional isocyanate (a1) and at least one polyfunctional aromatic amine (a2) in a solvent, optionally in the presence of water as component (a3) and optionally in the presence of at least one catalyst (a4);
(b) removal of the solvent to obtain the aerogel or xerogel.

Components (a1) to (a4) used with preference in step (a) and the ratios are elucidated hereinafter.

The polyfunctional isocyanates (a1) are referred to hereinafter collectively as component (a1). Correspondingly, the polyfunctional aromatic amines (a2) are referred to hereinafter collectively as component (a2). It is obvious to the person skilled in the art that the monomer components mentioned are present in converted form in the organic porous material.

Functionality of a compound shall be understood in the context of the present invention to mean the number of reactive groups per molecule. In the case of monomer component (a1), the functionality is the number of isocyanate groups per molecule. In the case of the amino groups of monomer component (a2), the functionality refers to the number of reactive amino groups per molecule. A polyfunctional compound has a functionality of at least 2.

If mixtures of compounds with different functionality are used as component (a1) or (a2), the functionality of the components is calculated in each case from the number-weighted average functionality of the individual compounds. A polyfunctional compound comprises at least two of the abovementioned functional groups per molecule.

Component (a1)

Preference is given to using at least one polyfunctional isocyanate as component (a1).

In the process according to the invention, the amount of component (a1) used is preferably at least 20% by weight, especially at least 30% by weight, more preferably at least 40% by weight, even more preferably at least 55% by weight, especially at least 68% by weight, based in each case on the total weight of components (a1), (a2) and optionally (a3), which adds up to 100% by weight. In the process according to the invention, the amount of component (a1) used is also preferably at most 99.8% by weight, especially at most 99.3% by weight, more preferably at most 97.5% by weight, based in each case on the total weight of components (a1), (a2) and optionally (a3), which adds up to 100% by weight.

Useful polyfunctional isocyanates include aromatic, aliphatic, cycloaliphatic and/or araliphatic isocyanates. Such polyfunctional isocyanates are known per se or can be prepared by methods known per se. The polyfunctional isocyanates can especially also be used as mixtures, such that component (a1) in this case comprises different polyfunctional isocyanates. Polyfunctional isocyanates useful as monomer units (a1) have two (referred to hereinafter as diisocyanates) or more than two isocyanate groups per molecule of the monomer component.

Especially suitable are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyldiphenyl diisocyanate, 1,2-diphenylethane diisocyanate and/or p-phenylene diisocyanate (PPDI), tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and dicyclohexylmethane 4,4'-, 2,4'- and/or 2,2'-diisocyanate.

Preferred polyfunctional isocyanates (a1) are aromatic isocyanates. This is especially true when water is used as component (a3).

Particularly preferred polyfunctional isocyanates of component (a1) are the following embodiments:
i) polyfunctional isocyanates based on tolylene diisocyanate (TDI), especially 2,4-TDI or 2,6-TDI or mixtures of 2,4- and 2,6-TDI;
ii) polyfunctional isocyanates based on diphenylmethane diisocyanate (MDI), especially 2,2'-MDI or 2,4'-MDI or 4,4'-MDI or oligomeric MDI, which is also referred to as polyphenylpolymethylene isocyanate, or mixtures of two or three of the aforementioned diphenylmethane diisocyanates, or crude MDI which is obtained in the preparation of MDI, or mixtures of at least one oligomer of MDI and at least one of the aforementioned low molecular weight MDI derivatives;
iii) mixtures of at least one aromatic isocyanate according to embodiment i) and at least one aromatic isocyanate according to embodiment ii).

A particularly preferred polyfunctional isocyanate is oligomeric diphenylmethane diisocyanate. Oligomeric diphenylmethane diisocyanate (referred to hereinafter as oligomeric MDI) is a mixture of a plurality of oligomeric condensation products and hence derivatives of diphenylmethane diisocyanate (MDI). The polyfunctional isocyanates can preferably also be formed from mixtures of monomeric aromatic diisocyanates and oligomeric MDI.

Oligomeric MDI comprises one or more polycyclic condensation products of MDI with a functionality of more than 2, especially 3 or 4 or 5. Oligomeric MDI is known and is frequently referred to as polyphenylpolymethylene isocyanate or else as polymeric MDI. Oligomeric MDI is typically formed from a mixture of MDI-based isocyanates with different functionality. Typically, oligomeric MDI is used in the mixture with monomeric MDI.

The (mean) functionality of an isocyanate which comprises oligomeric MDI may vary within the range from about 2.2 to about 5, especially from 2.4 to 3.5, especially from 2.5 to 3. Such a mixture of MDI-based polyfunctional isocyanates with different functionalities is especially crude MDI, which is formed in the preparation of MDI, typically catalyzed by hydrochloric acid, as an intermediate of the preparation of crude MDI.

Polyfunctional isocyanates or mixtures of a plurality of polyfunctional isocyanates based on MDI are known and are sold, for example, by BASF Polyurethanes GmbH under the Lupranat® name.

The functionality of component (a1) is preferably at least two, especially at least 2.2 and more preferably at least 2.4. The functionality of component (a1) is preferably from 2.2 to 4 and more preferably from 2.4 to 3.

The content of isocyanate groups of component (a1) is preferably from 5 to 10 mmol/g, especially from 6 to 9 mmol/g, more preferably from 7 to 8.5 mmol/g. The person skilled in the art is aware that the content of isocyanate groups in mmol/g and what is called the equivalent weight in g/equivalent are in a reciprocal relationship. The content of isocyanate groups in mmol/g is calculated from the content in % by weight according to ASTM D-5155-96 A.

In a preferred embodiment, component (a1) consists of at least one polyfunctional isocyanate selected from diphenylmethane 4,4'-diisocyanate, diphenylmethane 2,4'-diisocyanate, diphenylmethane 2,2'-diisocyanate and oligomeric diphenylmethane diisocyanate. In the context of this preferred embodiment, component (a1) more preferably comprises oligomeric diphenylmethane diisocyanate and has a functionality of at least 2.4.

The viscosity of component (a1) used may vary within a wide range. Component (a1) preferably has a viscosity of 100 to 3000 mPa·s, more preferably of 200 to 2500 mPa·s.

Component (a2)

In the process preferred in accordance with the invention, component (a2) is at least one polyfunctional aromatic amine.

Component (a2) may in some cases be generated in situ. In such an embodiment, the reaction in step (a) is performed in the presence of water (a3). Water reacts with the isocyanate groups to form amino groups with release of $CO_2$. Thus, polyfunctional amines are in some cases generated as an intermediate (in situ). They are converted to urea linkages later in the reaction with isocyanate groups.

In this preferred embodiment, the reaction is performed in the presence of water (a3) and a polyfunctional aromatic amine as component (a2), and optionally in the presence of a catalyst (a4).

In a further, likewise preferred embodiment, the reaction of component (a1) and a polyfunctional aromatic amine as component (a2) is optionally performed in the presence of a catalyst (a4). In this case, no water (a3) is present.

Polyfunctional aromatic amines are known per se to those skilled in the art. Polyfunctional amines are understood to mean those which have at least two amino groups reactive toward isocyanates per molecule. Amino groups reactive toward isocyanates are primary and secondary amino groups, the reactivity of the primary amino groups generally being much higher than that of the secondary amino groups.

The polyfunctional aromatic amines are preferably bicyclic aromatic compounds having two primary amino groups (bifunctional aromatic amines), corresponding tri- or polycyclic aromatic compounds having more than two primary amino groups, or mixtures of the aforementioned compounds. Preferred polyfunctional aromatic amines of component (a2) are especially isomers and derivatives of diaminodiphenylmethane.

Said bifunctional bicyclic aromatic amines are more preferably those of the general formula I

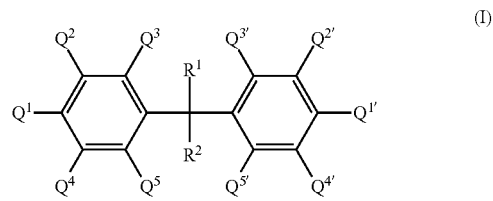

where $R^1$ and $R^2$ may be the same or different and are each independently selected from hydrogen and linear or branched alkyl groups having from 1 to 6 carbon atoms, and where all substituents $Q^1$ to $Q^5$ and $Q^{1'}$ to $Q^{5'}$ are the same or different and are each independently selected from hydrogen, a primary amino group and a linear or branched alkyl group having from 1 to 12 carbon atoms, where the alkyl group may bear further functional groups provided that the compound of the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group.

In one embodiment, the alkyl groups within the substituents Q according to the general formula I are selected from methyl, ethyl, n-propyl, isopropyl, n-butyl, sec-butyl and tert-butyl. Such compounds are referred to hereinafter as substituted aromatic amines (a2-s). However, it is likewise preferred when all substituents Q are hydrogen when they are not amino groups as defined above (so-called unsubstituted polyfunctional aromatic amines).

Preferably, $R^1$ and $R^2$ within the general formula I are the same or different and are each independently selected from hydrogen, a primary amino group and a linear or branched alkyl group having from 1 to 6 carbon atoms. Preferably, $R^1$ and $R^2$ are each selected from hydrogen and methyl. More preferably, $R^1=R^2=H$.

Suitable polyfunctional aromatic amines (a2) are also especially isomers and derivatives of toluenediamine. Isomers and derivatives of toluenediamine preferred within component (a2) are especially toluene-2,4-diamine and/or toluene-2,6-diamine and diethyltoluenediamines, especially 3,5-diethyltoluene-2,4-diamine and/or 3,5-diethyltoluene-2,6-diamine.

Most preferably, component (a2) comprises at least one polyfunctional aromatic amine selected from 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more polycyclic methylene-bridged condensation products of aniline and formaldehyde. Oligomeric MDA comprises at least one, but generally several oligomers of MDA having a functionality of more than 2, especially 3 or 4 or 5. Oligomeric MDA is known or can be prepared by methods known per se. Typically, oligomeric MDA is used in the form of mixtures with monomeric MDA.

The (mean) functionality of a polyfunctional amine of component (a2) which comprises oligomeric MDA may vary within the range from about 2.3 to about 5, especially from 2.3 to 3.5 and especially from 2.3 to 3. Such a mixture of MDA-based polyfunctional amines with different functionalities is especially crude MDA, which is the result especially of the condensation of aniline with formaldehyde, typically catalyzed by hydrochloric acid, as an intermediate of the preparation of crude MDI.

More preferably, the at least one polyfunctional aromatic amine comprises diaminodiphenylmethane or a derivative of diaminodiphenylmethane. More preferably, the at least one polyfunctional aromatic amine comprises oligomeric diaminodiphenylmethane. It is particularly preferred when component (a2) comprises oligomeric diaminodiphenylmethane as compound (a2) and has an overall functionality of at least 2.1. More particularly, component (a2) comprises oligomeric diaminodiphenylmethane and has a functionality of at least 2.4.

It is possible in the context of the present invention to control the reactivity of the primary amino groups by using substituted polyfunctional aromatic amines within component (a2). The substituted polyfunctional aromatic amines mentioned and detailed below, referred to hereinafter as (a2-s), can be used in a mixture with the abovementioned (unsubstituted) diaminodiphenylmethanes (all Q in formula I hydrogen, if not $NH_2$) or else exclusively.

In this embodiment, $Q^2$, $Q^4$, and $Q^{4'}$ within the formula I shown above including the corresponding definitions are preferably each selected such that the compound of the general formula I has at least one linear or branched alkyl group which may bear further functional groups having from 1 to 12 carbon atoms in the a position to at least one primary amino group bonded to the aromatic ring.

Preferably, $Q^2$, $Q^4$, $Q^{2'}$ and $Q^{4'}$ in this embodiment are selected such that the substituted aromatic amine (a2-s) comprises at least two primary amino groups, each of which has one or two linear or branched alkyl groups having from 1 to 12 carbon atoms in the a position, which may bear further functional groups. When one or more of $Q^2$, $Q^4$, $Q^{2'}$ and $Q^{4'}$ are selected such that they correspond to linear or branched alkyl groups having from 1 to 12 carbon atoms which bear further functional groups, preference is given to amino groups and/or hydroxyl groups and/or halogen atoms as such functional groups.

Preferably, the amines (a2-s) are selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions may be the same or different and are each independently selected from linear or branched alkyl groups having from 1 to 12 carbon atoms, which may bear further functional groups. The aforementioned alkyl groups are preferably methyl, ethyl, n-propyl, isopropyl, n-butyl, sec-butyl or t-butyl (each unsubstituted).

In one embodiment, one, more than one or all hydrogen atoms of one or more alkyl groups of the substituents Q may be replaced by halogen atoms, especially chlorine. Alternatively, one, more than one or all hydrogen atoms of one or more alkyl groups of the substituents Q may be replaced by $NH_2$ or OH. It is, however, preferred when the alkyl groups within the general formula I are formed from carbon and hydrogen.

In a particularly preferred embodiment, component (a2-s) comprises 3,3',5,5'-tetraalkyl-4,4'-diaminodiphenylmethane, where the alkyl groups may be the same or different and are each independently selected from linear or branched alkyl groups having from 1 to 12 carbon atoms, which may optionally bear functional groups. Aforementioned alkyl groups are preferably selected from unsubstituted alkyl groups, especially methyl, ethyl, n-propyl, isopropyl, n-butyl, sec-butyl and tert-butyl, more preferably from methyl and ethyl. Very particular preference is given to 3,3',5,5'-tetraethyl-4,4'-diaminodiphenylmethane and/or 3,3',5,5'-tetramethyl-4,4'-diaminodiphenylmethane.

The aforementioned polyfunctional amines of component (a2) are known per se to those skilled in the art or can be prepared by known methods. One of the known methods is the reaction of aniline or of derivatives of aniline with formaldehyde under acidic catalysis.

As explained above, water as component (a3) can partly replace the polyfunctional aromatic amine, by virtue of its reacting in situ with an amount, which in that case is calculated beforehand, of additional polyfunctional aromatic isocyanate of component (a1) to give a corresponding polyfunctional aromatic amine.

When water is used as component (a3), as detailed below, particular boundary conditions should preferably be complied with.

As already detailed above, water reacts with the isocyanate groups to give amino groups while releasing $CO_2$. Thus, polyfunctional amines are partly generated as an intermediate (in situ). Later in the reaction, they are reacted with isocyanate groups to give urea linkages. The generation of amines as intermediate leads to porous materials with high mechanical stability and low thermal conductivity. The $CO_2$ formed must not, however, disrupt the gelation so significantly that the structure of the resulting porous material is influenced in an undesirable manner. This gives rise to the above-detailed preferred upper limit for the water content based on the total weight of components (a1) to (a3), which is preferably at most 30% by weight, more preferably at most 25% by weight, especially at most 20% by weight. A water content within this range additionally leads to the advantage that any residual water need not be removed in a complex manner by drying on completion of gelation.

When water is used as component (a3), the amount of water used with preference is from 0.1 to 30% by weight, especially from 0.2 to 25% by weight, more preferably from 0.5 to 20% by weight, based in each case on the total weight of components (a1) to (a3) which adds up to 100% by weight.

Within the ranges detailed above, the preferred amount of water depends on whether a catalyst (a4) is used or not.

In a first variant which comprises the use of water, components (a1) to (a3) are reacted without the presence of a catalyst (a4). In this first embodiment, it has been found to be advantageous to use from 5 to 30% by weight, especially from 6 to 25% by weight, more preferably from 8 to 20% by weight, of water as component (a3), based in each case on the total weight of components (a1) to (a3) which adds up to 100% by weight.

In the context of this first embodiment, the aforementioned components (a1) to (a3) are preferably used in the following ratio, based in each case on the total weight of components (a1) to (a3) which adds up to 100% by weight: from 40 to 94.9% by weight, especially from 55 to 93.5% by weight, more preferably from 68 to 90% by weight, of component (a1), from 0.1 to 30% by weight, especially from 0.5 to 20% by weight, more preferably from 2 to 12% by weight, of polyfunctional aromatic amines (a2) and from 5 to 30% by weight, especially from 6 to 25, more preferably from 8 to 20% by weight, of water (a3).

A theoretical content of amino groups is calculated from the water content and the content of reactive isocyanate groups of component (a1), by assuming complete reaction of the water with the isocyanate groups of component (a1) to form a corresponding amount of amino groups and adding this content to the content resulting from component (a2) (total $n^{amine}$). The resulting use ratio of the theoretically remaining NCO groups $n^{NCO}$ in relation to the amino groups theoretically formed and used is referred to hereinafter as the theoretical use ratio $n^{NCO}/n^{amine}$ and is an equivalence ratio, i.e. a molar ratio of the particular functional groups.

In the aforementioned first variant, the theoretical use ratio (equivalence ratio) $n^{NCO}/n^{amine}$ can vary over a wide range and may especially be from 0.6 to 5. $n^{NCO}/n^{amine}$ is preferably from 1 to 1.6, especially from 1.1 to 1.4.

In a second preferred variant which comprises the use of water, components (a1) to (a3) are reacted in the presence of a catalyst (a4). In this second embodiment, it has been found to be advantageous to use from 0.1 to 15% by weight, especially from 0.2 to 15% by weight, more preferably from 0.5 to 12% by weight, of water (a3), based in each case on the total weight of components (a1) to (a3) which adds up to 100% by weight. Within the aforementioned ranges, particularly favorable mechanical properties of the resulting porous materials arise, the reason for which is a particularly favorable network structure. A higher amount of water has an adverse effect on the network structure and is disadvantageous in relation to the final properties of the porous material.

In the context of the preferred second variant, the aforementioned components (a1) to (a3) are preferably used in the following ratio, based in each case on the total weight of components (a1) to (a3) which adds up to 100% by weight: from 55 to 99.8% by weight, especially from 65 to 99.3% by weight, more preferably from 76 to 97.5% by weight, of component (a1), from 0.1 to 30% by weight, especially from 0.5 to 20% by weight, more preferably from 2 to 12% by weight, of polyfunctional aromatic amine (a2) and from 0.1 to 15% by weight, especially from 0.2 to 15, more preferably from 0.5 to 12% by weight, of water (a3).

In the aforementioned second variant, the theoretical use ratio (equivalence ratio) $n^{NCO}/n^{amine}$ is preferably from 1.01 to 5. More preferably, the equivalence ratio mentioned is from 1.1 to 3, especially from 1.1 to 2. An excess of $n^{NCO}$ over $n^{amine}$ leads in this embodiment to lower shrinkage of the porous material, especially xerogel, on removal of the solvent, and, as a result of synergistic interaction with the catalyst (a4), to an improved network structure and to improved final properties of the resulting porous material.

In the second preferred embodiment which has already been explained above, the reaction according to step (a) is effected in the absence of water (a3). Within this preferred embodiment, the components (a1) and (a2) detailed above are preferably used in the following ratio, based in each case on the total weight of components (a1) and (a2) which adds up to 100% by weight: from 20 to 80% by weight, especially from 25 to 75% by weight, more preferably from 35 to 68% by weight, of component (a1), from 20 to 80% by weight, especially from 25 to 75% by weight, more preferably from 32 to 65% by weight, of component (a2); no (a3).

Within this above-detailed embodiment, the use ratio (equivalence ratio) $n^{NCO}/n^{amine}$ is preferably from 1.01 to 5. Said equivalence ratio is more preferably from 1.1 to 3, especially from 1.1 to 2. An excess of $n^{NCO}$ over $n^{amine}$ leads, in this embodiment too, to lower shrinkage of the porous material, especially xerogel, on removal of the solvent, and, as a result of synergistic interaction with the catalyst (a4), to an improved network structure and to improved final properties of the resulting porous material.

Components (a1) to (a3) are referred to collectively hereinafter as organic gel precursor (A).

Catalyst (a4)

In a preferred embodiment, the process according to the invention is preferably performed in the presence of at least one catalyst as component (a4).

Useful catalysts include, in principle, all catalysts which are known to those skilled in the art and which accelerate the trimerization of isocyanates (called trimerization catalysts) and/or the reaction of isocyanates with amino groups (called gelling catalysts) and/or—when water is used—the reaction of isocyanates with water (called blowing catalysts).

The corresponding catalysts are known per se and have different characteristics with regard to the three reactions mentioned above. According to the characteristic, they can thus be assigned to one or more of the aforementioned types. The person skilled in the art is additionally aware that reactions other than those mentioned above can also occur.

Corresponding catalysts can be characterized, inter alia, with reference to their gelling to blowing ratio, as known, for example, from Polyurethane [Polyurethanes], 3rd edition, G. Oertel, Hanser Verlag, Munich, 1993, pages 104 to 110.

When no component (a3), i.e. no water, is used, preferred catalysts have a significant activity with regard to trimerization. This has a favorable influence on the homogeneity of the network structure, which results in particularly favorable mechanical properties.

When water is used as component (a3), preferred catalysts (a4) have a balanced gelling to blowing ratio, such that the reaction of component (a1) with water is not too greatly accelerated, leading to an adverse effect on the network structure, and at the same time results in a short gelling time, such that the demolding time is advantageously short. Preferred catalysts simultaneously have significant activity with regard to trimerization. This has a favorable influence on the homogeneity of the network structure, which results in particularly favorable mechanical properties.

The catalysts may be a monomer unit (incorporable catalyst) or not be incorporable.

Component (a4) is appropriately used in the smallest effective amount. Preference is given to using amounts of 0.01 to 5 parts by weight, especially of 0.1 to 3 parts by weight, more preferably of 0.2 to 2.5 parts by weight, of component (a4), based on the total of 100 parts by weight of components (a1), (a2) and (a3).

Catalysts preferred within component (a4) are selected from the group consisting of primary, secondary and tertiary amines, triazine derivatives, organometallic compounds, metal chelates, quaternary ammonium salts, ammonium hydroxides, and alkali metal and alkaline earth metal hydroxides, alkoxides and carboxylates.

Suitable catalysts are especially strong bases, for example quaternary ammonium hydroxides, for example tetraalkylammonium hydroxides having 1 to 4 carbon atoms in the alkyl radical and benzyltrimethylammonium hydroxide, alkali metal hydroxides, for example potassium hydroxide or sodium hydroxide, and alkali metal alkoxides, for example sodium methoxide, potassium ethoxide and sodium ethoxide, and potassium isopropoxide.

Suitable catalysts are also especially alkali metal salts of carboxylic acids, for example potassium formate, sodium acetate, potassium acetate, potassium 2-ethylhexanoate, potassium adipate and sodium benzoate, alkali metal salts of long-chain fatty acids having 8 to 20, especially 10 to 20, carbon atoms and optionally lateral OH groups.

Suitable catalysts are also especially N-hydroxyalkyl quaternary ammonium carboxylates, for example trimethylhydroxypropylammonium formate.

Organometallic compounds are known per se to those skilled in the art, especially as gelling catalysts, and are likewise suitable as catalysts (a4). Organotin compounds, for example tin 2-ethylhexanoate and dibutyltin dilaurate, are preferred within component (a4). Additionally preferred are metal acetylacetonates, especially zinc acetylacetonate.

Tertiary amines are known per se to those skilled in the art as gelling catalysts and as trimerization catalysts. Tertiary amines are particularly preferred as catalysts (a4). Preferred tertiary amines are especially N,N-dimethylbenzylamine, N,N'-dimethylpiperazine, N,N-dimethylcyclohexylamine, N,N',N''-tris(dialkylaminoalkyl)-s-hexahydrotriazines, for example N,N',N''-tris(dimethylaminopropyl)-s-hexahydrotriazine, tris(dimethylaminomethyl)phenol, bis(2-dimethylaminoethyl) ether, N,N,N,N,N-pentamethyldiethylenetriamine, methylimidazole, dimethylimidazole, dimethylbenzylamine, 1,6-diazabicyclo[5.4.0]undec-7-ene, triethylamine, triethylenediamine (IUPAC: 1,4-diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine and diisopropanolamine.

Catalysts particularly preferred within component (a4) are selected from the group consisting of N,N-dimethylcyclohexylamine, bis(2-dimethylaminoethyl)ether, N,N,N,N,N-pentamethyldiethylenetriamine, methylimidazole, dimethylimidazole, dimethylbenzylamine, 1,6-diazabicyclo[5.4.0]undec-7-ene, tris(dimethylaminopropyl)hexahydrotriazine, triethylamine, tris(dimethylaminomethyl)phenol, triethylenediamine(diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, metal acetylacetonates, ammonium ethylhexanoate and metal ion ethylhexanoates.

The use of the catalysts (a4) preferred in the context of the present invention leads to porous materials with improved mechanical properties, especially to improved compressive strength. In addition, use of the catalysts (a4) reduces the gelling time, i.e. accelerates the gelling reaction, without adversely affecting other properties.

Solvent

The preparation of the organic aerogels or xerogels used in accordance with the invention takes place in the presence of a solvent.

In the context of the present invention, the term "solvent" comprises liquid diluents, i.e. both solvents in the narrower sense and dispersants. The mixture may especially be a true solution, a colloidal solution or a dispersion, for example an emulsion or suspension. The mixture is preferably a true solution. The solvent is a compound which is liquid under the conditions of step (a), preferably an organic solvent.

Useful solvents include in principle an organic compound or a mixture of several compounds, the solvent being liquid under the temperature and pressure conditions under which the mixture is provided (solution conditions for short). The composition of the solvent is selected such that it is capable of dissolving or dispersing, preferably of dissolving, the organic gel precursor. Preferred solvents in the context of the above-detailed preferred process for preparing the organic aerogels or xerogels are those which are a solvent for the organic gel precursor (A), i.e. those which fully dissolve the organic gel precursor (A) under reaction conditions.

The reaction product of the reaction in the presence of the solvent is at first a gel, i.e. a viscoelastic chemical network which is swollen by the solvent. A solvent which is a good swelling agent for the network formed generally leads to a network with fine pores and small mean pore diameter, whereas a solvent which is a poor swelling agent for the resulting gel generally leads to a coarse-pore network with large mean pore diameter.

The selection of the solvent thus influences the target pore size distribution and the target porosity. The solvent is additionally generally selected such that there is very substantially no occurrence of precipitation or flocculation as a result of formation of a precipitated reaction product during or after step (a) of the process according to the invention.

In the case of selection of a suitable solvent, the proportion of precipitated reaction product is typically less than 1% by weight, based on the total weight of the mixture. The amount of precipitated product formed in a particular solvent can be determined gravimetrically, by filtering the reaction mixture through a suitable filter before it reaches the gelling point.

Useful solvents include the solvents known from the prior art for isocyanate-based polymers. Preferred solvents are those which are a solvent for components (a1), (a2) and optionally (a3), i.e. those which substantially fully dissolve the constituents of components (a1), (a2) and optionally (a3) under reaction conditions. The solvent is preferably inert, i.e. unreactive, toward component (a1).

Useful solvents include, for example, ketones, aldehydes, alkyl alkanoates, amides such as formamide and N-methylpyrrolidone, sulfoxides such as dimethyl sulfoxide, aliphatic and cycloaliphatic halogenated hydrocarbons, halogenated aromatic compounds and fluorinated ethers. Likewise useful are mixtures of two or more of the aforementioned compounds.

Further useful solvents are acetals, especially diethoxymethane, dimethoxymethane and 1,3-dioxolane.

Dialkyl ethers and cyclic ethers are likewise suitable as solvents. Preferred dialkyl ethers are especially those having 2 to 6 carbon atoms, especially methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are especially tetrahydrofuran, dioxane and tetrahydropyran.

Preferred solvents are also alkyl alkanoates, especially methyl formate, methyl acetate, ethyl formate, butyl acetate and ethyl acetate. Preferred halogenated solvents are described in WO 00/24799, page 4 line 12 to page 5 line 4.

Aldehydes and/or ketones are preferred as solvents. Aldehydes or ketones suitable as solvents are especially those corresponding to the general formula $R^2$—(CO)—$R^1$ where $R^1$ and $R^2$ are each hydrogen or alkyl groups having 1, 2, 3 or 4 carbon atoms. Suitable aldehydes or ketones are especially acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenealdehyde, cyanacetaldehyde, ethyl glyoxylate, benzaldehyde, acetone, diethyl ketone, methyl ethyl ketone, methyl isobutyl ketone, methyl n-butyl ketone, ethyl isopropyl ketone, 2-acetylfuran, 2-methoxy-4-methylpentan-2-one, cyclohexanone and acetophenone. The aforementioned aldehydes and ketones can also be used in the form of mixtures. Ketones and aldehydes having alkyl groups with up to 3 carbon atoms per substituent are particularly preferred as solvent. Very particular preference is given to ketones of the general formula $R^1(CO)R^2$, where $R^1$ and $R^2$ are each independently selected from alkyl groups having 1 to 3 carbon atoms. In a first preferred embodiment, the ketone is acetone. In a further preferred embodiment, at least one of the two substituents $R^1$ and/or $R^2$ comprises an alkyl group having at least 2 carbon atoms, especially methyl ethyl ketone. Use of the aforementioned particularly preferred ketones in combination with the process according to the invention affords porous materials with particularly small mean pore diameter. Without wishing to impose any restriction, it is thought that the pore structure of the gel which forms has particularly fine pores due to the higher affinity of the aforementioned particularly preferred ketones.

In many cases, particularly suitable solvents result from use of two or more compounds completely miscible with one another, selected from the aforementioned solvents, in the form of a mixture.

In order to obtain, in step (a), a sufficiently stable gel which does not shrink too greatly in the course of drying in step (b), the proportion of components (a1) to (a3) in the total weight of components (a1) to (a3) and the solvent, which adds up to 100% by weight, must generally not be less than 5% by weight. Preferably, the proportion of components (a1) to (a3) in the total weight of components (a1) to (a3) and the solvent, which adds up to 100% by weight, is at least 6% by weight, more preferably at least 8% by weight, especially at least 10% by weight.

On the other hand, the selected concentration of components (a1) to (a3) in the mixture provided must not be too high since a porous material with favorable properties is otherwise not obtained. In general, the proportion of components (a1) to (a3) in the total weight of components (a1) to (a3) and the solvent, which adds up to 100% by weight, is at most 40% by weight. The proportion of components (a1) to (a3) in the total weight of components (a1) to (a3) and the solvent, which adds up to 100% by weight, is preferably at most 35% by weight, more preferably at most 25% by weight, especially at most 20% by weight.

The proportion by weight of components (a1) to (a3) in the total weight of components (a1) to (a3) and of the solvent, which adds up to 100% by weight, preferably totals from 8 to 25% by weight, especially from 10 to 20% by weight, more preferably from 12 to 18% by weight. Compliance with the amount of the feedstocks within the range mentioned leads to porous materials with particularly favorable pore structure, low thermal conductivity and low shrinkage on drying.

The reaction according to step (a) of the process according to the invention is preferably preceded by the provision of components (a1), (a2), optionally (a3) and optionally (a4), and of the solvent.

Preferably, components (a1) on the one hand, and (a2) and optionally (a3) and optionally (a4) on the other hand, are each provided separately in a suitable portion of the solvent. The separate provision enables optimal control of the gelling reaction before and during the mixing.

When water is used as component (a3), component (a3) is more preferably provided separately from component (a1). This avoids the reaction of water with component (a1) to form networks without the presence of component (a2). Otherwise, the prior mixing of water with component (a1) leads to less favorable properties in relation to the homogeneity of the pore structure and the thermal conductivity of the resulting materials.

The mixture or mixtures provided before performance of step (a) may also comprise customary assistants known to those skilled in the art as further constituents. Examples include surface-active substances, nucleators, oxidation stabilizers, sliding and demolding aids, dyes and pigments, stabilizers, for example against hydrolysis, light, heat or discoloration, inorganic and/or organic fillers, reinforcers and biocides.

Further details of the assistants and additives mentioned above can be found in the specialist literature, for example in Plastics Additive Handbook, 5th edition, H. Zweifel, ed. Hanser Publishers, Munich, 2001, 104-127.

In order to perform the reaction according to step (a) of the preferred process, it is first necessary to produce a homogeneous mixture of the components provided prior to the reaction according to step (a).

The components converted within step (a) can be provided in a customary manner. For this purpose, preference is given to using a stirrer or another mixing apparatus in order to achieve good and rapid mixing. The time required to obtain the homogeneous mixture should be small in relation to the time within which the gelling reaction leads to the at least partial formation of a gel, in order to avoid mixing faults. The other mixing conditions are generally uncritical; for example, it is possible to mix at 0 to 100° C. and 0.1 to 10 bar (absolute), especially, for example, at room temperature and atmospheric pressure. On completion of production of a homogeneous mixture, the mixing apparatus is preferably switched off.

The gelling reaction is a polyaddition reaction, more particularly a polyaddition of isocyanate groups and amino groups.

A gel shall be understood to mean a crosslinked system based on a polymer which is in contact with a liquid (called solvogel or lyogel, or with water as the liquid: aquagel or hydrogel). The polymer phase forms a continuous three-dimensional network.

In the course of step (a) of the process according to the invention, the gel typically forms by standing, for example by simply leaving the container, reaction vessel or reactor containing the mixture to stand (referred to hereinafter as gelling apparatus). Preferably, the mixture is not stirred or mixed during the gelling (gel formation) because this could hinder the formation of the gel. It has been found to be advantageous to cover the mixture during gelling, or to close the gelling apparatus.

Gelling is known per se to those skilled in the art and is described, for example, in WO-2009/027310 on page 21 line 19 to page 23 line 13.

In the preferred process, the solvent is removed within step (b) (drying). In principle, drying under supercritical conditions is an option, preferably after exchange of the solvent for $CO_2$ or other solvents suitable for the purposes of supercritical drying. Such drying is known per se to those skilled in the art. Supercritical conditions indicate a temperature and a pressure at which the fluid phase to be removed is in the supercritical state. This allows the shrinkage of the gel body on removal of the solvent to be reduced. The material obtained from the supercritical drying is referred to as aerogel.

However, in view of the simple process regime, it is preferred to dry the resulting gels by conversion of the liquid present in the gel to the gaseous state at a temperature and a pressure below the critical temperature and the critical pressure of the liquid present in the gel. The material obtained from the subcritical drying is referred to as xerogel.

The resulting gel is preferably dried by converting the solvent to the gaseous state at a temperature and a pressure below the critical temperature and the critical pressure of the solvent. Accordingly, the drying is preferably effected by removing the solvent which was present in the reaction without previous exchange for a further solvent.

Corresponding methods are likewise known to those skilled in the art and are described in WO-2009/027310 at page 26 line 22 to page 28 line 36.

The organic aerogels or xerogels used in accordance with the invention can be introduced in various ways into the coherently evacuable region of the inventive device.

The organic aerogels or organic xerogels can be converted to a powder by comminution, for example as described in EP-A 11155833.4. Subsequently, the powder can be blown into the coherently evacuable region or introduced through an orifice, as described, for example, in WO 2004/010042.

Alternatively, the xerogel in the still free-flowing state, i.e. before complete curing, can be introduced in the coherently evacuable region, for example in a component which later constitutes the coherently evacuable region in the device. The gel can cure therein, and the solvent is then removed as described above.

A further preferred variant of the introduction of the aerogels or xerogels used in accordance with the invention arises from the following process steps: (i) provision of the organic aerogel or xerogel as a shaped body, i.e. as a preshaped part, then (ii) altering the shaped body with parts of the later inventive device. These parts are especially modular constituents of the inventive device, especially polymer components which surround the coherently evacuable region in the inventive device. In other words: the inventive device or a modular part of the later device which comprises the coherently evacuable region, for example the housing of the device and/or a side wall or the door of the device, is built around the preshaped organic aerogel or xerogel.

The present invention also provides for the use of the above-described organic aerogels or organic xerogels within a coherently evacuable region in devices which have, in addition to the coherently evacuable region, a temperature-controllable useful region which is thermally insulated from the ambient temperature by the coherently evacuable region, said coherently evacuable region making up at least 30% by volume of the total volume which is occupied by a porous and/or cellular insulating material in the device.

EXAMPLES

The thermal conductivity was determined at 23° C. by means of a two-plate apparatus. For this purpose, a central circular metal plate was heated in a controlled manner. It was surrounded on both sides by two identical samples of known thickness. The outsides of the samples were coupled to thermally controlled heat sinks. The heating output was regulated under closed-loop control such that a constant temperature gradient over the samples is established in each case. The electrical energy introduced in the hotplate flows away as heat symmetrically through the two samples. In order to ensure one-dimensional heat flow, the central hotplate was surrounded by two concentric protective rings which are kept at the same temperature as the central plate.

To produce xerogels, the following compounds were used:
Oligomeric MDI (Lupranat® M50) with an NCO content of 31.5 g per 100 g to ASTM D-5155-96 A, a functionality in the range from 2.8 to 2.9 and a viscosity of 550 mPa·s at 25° C. to DIN 53018 (hereinafter "compound M50")

3,3',5,5'-tetraethyl-4,4'-diaminodiphenylmethane (hereinafter "MDEA")

Catalyst: triethanolamine

Example 1

2700 ml of a 23.4% by weight solution of compound M50 in acetone were mixed with 2700 ml of an acetone solution which comprised 1.8% by weight of MDEA, 0.9% by weight of triethanolamine and 1200 g of water. The result was a clear, low-viscosity mixture. The mixture was left to stand for curing at room temperature for 24 hours. Subsequently, the liquid (acetone) was removed by drying at 20° C. for 7 days. The resulting material had a density of 130 g/l.

The pressure-dependent thermal conductivity was determined using a specimen of length 320 mm and width 450 mm at a thickness of 25 mm. The results are compiled in table 1.

TABLE 1

| Pressure [mbar] | Thermal conductivity [mW/m * K] |
| --- | --- |
| 0.01 | 4.4 |
| 0.1 | 5.3 |
| 1 | 7.1 |
| 10 | 15 |
| 100 | 26 |
| 1000 | 34 |

Example 2

Comparative Example

In example 2, a heat-insulating rigid foam based on polyurethane was produced and compared with example 1.

For production of the polyurethane foam, the following compounds were used:
polyol A: polyether alcohol formed from sucrose, glycerol and propylene oxide, hydroxyl number 490
polyol B: polyether alcohol formed from propylene glycol and propylene oxide, hydroxyl number 105
polyol C: polyether alcohol formed from propylene glycol and propylene oxide, hydroxyl number 250
additive 1: Tegostab® B 8870 (silicone stabilizer from Evonik)
additive 2: Ortegol® 501 (a cell-opening surfactant from Evonik)
catalyst 1: Polycat® 58 (a tertiary amine from Air Products)
catalyst 2: potassium acetate in ethylene glycol (BASF)
oligomeric MDI (Lupranat® M70) with an NCO content of 31.4 g per 100 g to ASTM D-5155-96 A, a functionality in the region of approx. 2.9 and a viscosity of 650 mPa·s at 25° C. to DIN 53018 (hereinafter "compound M70").

The raw materials specified were used to produce a polyol component by mixing and reacted with the isocyanate (compound M70). The amounts of the feedstocks used can be found in table 2. The mixing was effected in a mixing head. The reaction mixture was discharged in a laboratory mold with side lengths 418×700×455 mm and allowed to cure therein.

TABLE 2

| | Example 2C [parts by weight] |
| --- | --- |
| polyol A | 44.10 |
| polyol B | 44.10 |
| polyol C | 9.15 |
| water | 0.55 |
| stabilizer | 0.90 |
| catalyst 1 | 0.50 |
| catalyst 2 | 0.70 |
| cell opener | 1.80 |
| cyclopentane | 9.50 |
| compound M70 | 194 |
| index | 244 |

Specimens of size 19×19×2 cm were sawn out of the rigid foam thus obtained and out of the xerogel and packed into a gastight film, which was sealed by welding after evacuation to pressures less than 0.1 mbar. The evacuation time was determined (Table 3).

TABLE 3

| Sample | Evacuation time [min] down to <0.1 mbar | Thermal conductivity [mW/m * K] at <0.1 mbar |
|---|---|---|
| Example 1 | 5 | 4-5 |
| Example 2C | 15 | 7-9 |

The use of organic xerogels based on polyurea improved the thermal conductivity compared to rigid PUR foam which is used as an insulating material for refrigerators. At the same time, the evacuation time was reduced significantly.

The invention claimed is:

1. A dynamically evacuable and electrically operated device, comprising:
   a coherently evacuable region; and
   a temperature-controllable useful region, which is thermally insulated from ambient temperature by the coherently evacuable region; and
   means for actively maintaining a vacuum, such that a pressure in the coherently evacuable region of the device is constantly within a defined pressure range;
   wherein:
   the coherently evacuable region constitutes at least 20% by volume of a total volume which is occupied by a porous and/or cellular insulating material in the device;
   the coherently evacuable region comprises an organic porous material comprising at least one of an organic aerogel and an organic xerogel;
   the organic porous material is obtained by a process comprising:
      reacting at least one polyfunctional isocyanate and at least one polyfunctional aromatic amine in a solvent, optionally in the presence of water and optionally in the presence of at least one catalyst; and
      removing the solvent to obtain the aerogel or xerogel; and
   the at least one polyfunctional aromatic amine is a compound of formula (I):

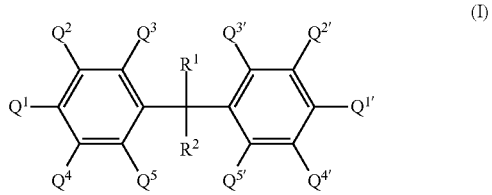

(I)

where:
   each of $R^1$ and $R^2$ is independently selected from hydrogen and a linear or branched alkyl group having from 1 to 6 carbon atoms;
   each of $Q^1$ to $Q^5$ and $Q^{1'}$ to $Q^{5'}$ is independently selected from hydrogen, a primary amino group, and a linear or branched alkyl group having from 1 to 12 carbon atoms;
   the alkyl group may bear further functional groups provided that the compound of formula (I) contains at least two primary amino groups;
   at least one of $Q^1$, $Q^3$ and $Q^5$ is a primary amino group;
   at least one of $Q^{1'}$, $Q^{3'}$ and $Q^{5'}$ is a primary amino group; and
   $Q^2$, $Q^4$, $Q^{2'}$ and $Q^{4'}$ are selected such that the compound of formula (I) contains at least one linear or branched alkyl group which may bear further functional groups and has 1 to 12 carbon atoms in an α position to at least one primary amino group bonded to the aromatic ring.

2. The device according to claim 1, wherein the device is a refrigerating unit.

3. The device according to claim 1, wherein the device is a refrigerator.

4. The device according to claim 1, wherein the organic aerogel or xerogel has a volume-weighted mean pore size of 50 to 3000 nm.

5. The device according to claim 1, wherein the organic porous material comprises an organic xerogel.

6. The device according to claim 1, wherein the at least one polyfunctional isocyanate comprises oligomeric diphenylmethane diisocyanate and has a functionality of at least 2.4.

7. The device according to claim 1, wherein the organic porous material is obtained by a process comprising reacting at least one polyfunctional isocyanate and at least one polyfunctional aromatic amine in a solvent in the presence of at least one catalyst.

8. The device according to claim 1, wherein the organic porous material is obtained by a process comprising reacting at least one polyfunctional isocyanate and at least one polyfunctional aromatic amine in a solvent in the presence of water.

9. The device according to claim 1, wherein the organic porous material is obtained by a process comprising reacting at least one polyfunctional isocyanate and at least one polyfunctional aromatic amine in a solvent in the absence of water.

* * * * *